United States Patent
Hill

[11] 3,755,636
[45] Aug. 28, 1973

[54] WATER CONTROL TRIGGER
[76] Inventor: Herbert Hoover Hill, 919 Starer Ave., Akron, Ohio 44320
[22] Filed: July 27, 1971
[21] Appl. No.: 166,522

[52] U.S. Cl. .............................. 200/61.05, 318/483
[51] Int. Cl. .............................................. H01h 9/00
[58] Field of Search ................... 200/61.04, 61.05; 340/235; 318/483

[56] References Cited
UNITED STATES PATENTS
3,386,022  5/1968  Redmond ........................... 318/483
2,675,227  4/1954  Baird et al. .................. 200/61.04 X
2,640,958  6/1953  Davis .............................. 340/235 X
2,769,872  11/1956  Clark .............................. 200/61.05

Primary Examiner—Herman J. Hohauser
Assistant Examiner—M. Ginsburg

[57] ABSTRACT

A control device for automatically closing a window of a house or automatically raising a roof of a convertible automobile, the device consisting of an electrical switch that is activated by rainwater so to close the switch; and wherein the switch is automatically becomes deactivated after the rain has stopped falling for awhile.

2 Claims, 4 Drawing Figures

PATENTED AUG 28 1973    3,755,636
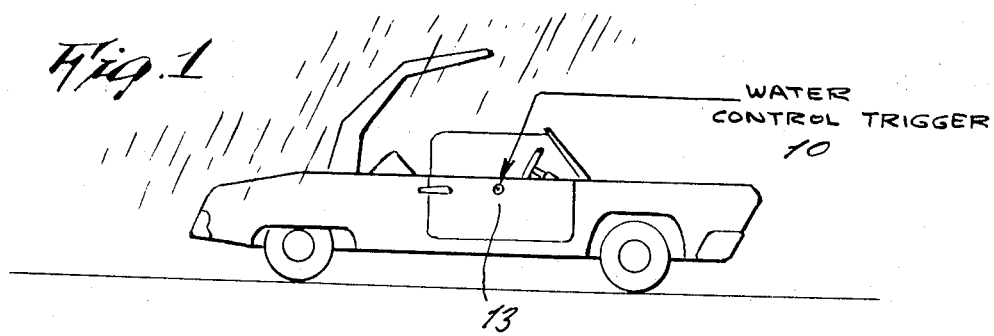
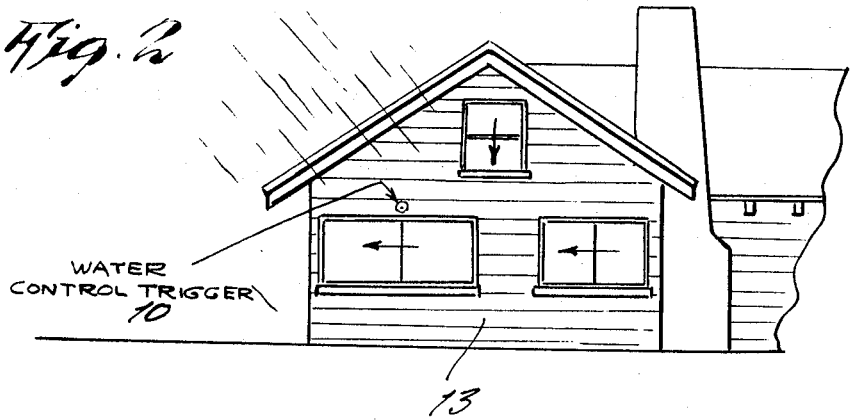
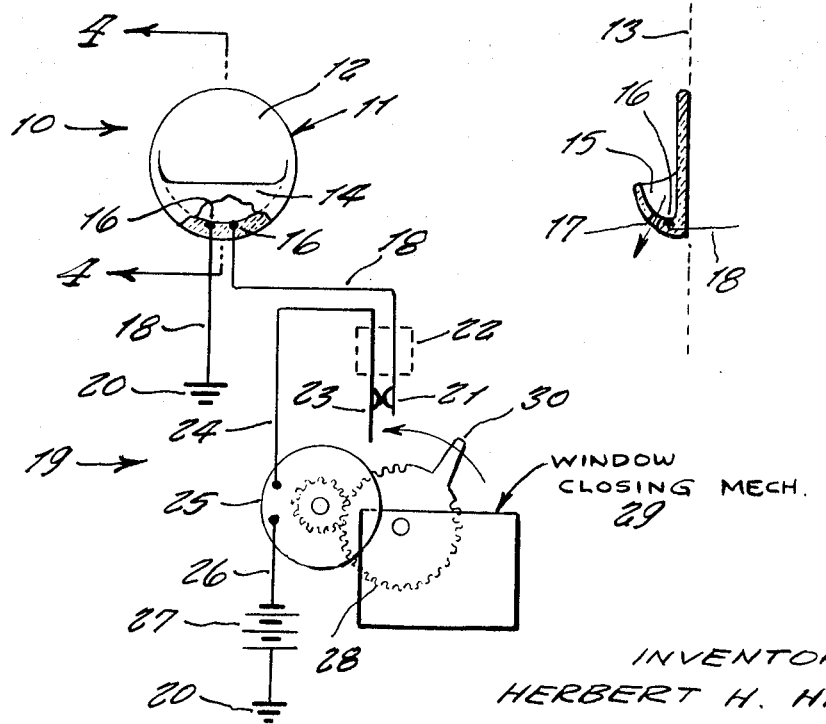
INVENTOR
HERBERT H. HILL

WATER CONTROL TRIGGER

This invention relates generally to switch controls. More specifically it relates to switch controls for activating electrical circuits.

It is generally well known to most persons that upon occassions they have gone to sleep at home and left the windows open so that rain occurring at night has entered and possibly damaged the premises by soaking furniture or badly streaking the walls. This situation is of course objectionable and therefore in want of improvement.

Accordingly, it is a principle object of the present invention to provide a control device that is automatically activated without attention of a person who is asleep so to close the window when a rain starts falling.

Another object is to provide a control device that is therefore automatically operated by the rain itself.

Another object is to provide a control device that is suitable for automatically closing windows and raising the roof of a convertible automobile when a rain starts, so to prevent water damage to the automobile interior.

Other objects are to provide a WATER CONTROL TRIGGER which is simple in design, inexpensive to manufacture, rugged in construction easy to use and efficient in operation.

These and other objects will be readily evident upon a study of the following specification and the accompanying drawing wherein:

FIG. 1 is a side view of a car using the invention to close windows and the convertible roof when a rain comes.

FIG. 2 shows the invention applied to a house to automatically close windows.

FIG. 3 is a diagram of the invention showing how rain automatically operates the device.

FIG. 4 is a cross section on line 4—4 of FIG. 3.

Referring now to the drawing in detail, the reference numeral 10 represents a water control trigger according to the present invention wherein there is a molded body 11 made of electrically insulated material and which includes a raised, flat back wall 12 for being mounted against any vertical supporting surface 13, and a relatively low front wall 14 so as to form a pocket 15 therebetween, and into which rain drops may fall when a rain starts. Accordingly, the rear wall extends higher than the front wall so to serve as a splash guard for guiding the rain drops into the trough or pocket 15. A pair of slightly spaced apart electrical contact buttons 16 are secured within the bottom of the pockets. Additionally close thereto is a small bleed opening 17 at approximately the same elevation and midway between the contacts through which the rain water can slowly pour outwardly of the pocket. Electrical conductors 18 connected to each button 16 extend outwardly through the pocket wall, as shown.

In operative installation the contact buttons 16 are incorporated into an electrical circuit 19 wherein one conductor 18 goes to ground 20 while the other conductor 18 goes to a contact leaf spring 21 of a switch 22; the contact spring 21 being normally engaged by contact leaf spring 23 connected by conductor 24 to one pole of a motor 25 the other pole of which is connected by conductor 26 to a battery or house electric power source 27 (depending upon application of the invention) which connects to ground 20. The motor through a gear train 28 drives a window closing mechanism 29 or other mechanism to raise a car roof or other equivalent needed tasks.

In case of rain developing, the rain falling into pocket 15 closes the electrical circuit between the buttons 16 so to cause the motor to drive the mechanism 29 that closes the windows or other tasks. A lug 30 of the mechanism 28 automatically trips the contact spring 23 to open the circuit to the motor after the window has been fully closed. Alternately the opening 17 lets all rain water out of the pocked after the rain has stopped so to open the circuit.

Thus a convertible car forgotten out-of-doors in open position, or an unattended house windows are automatically protected in case of a rain developing.

While various changes may be made in the detail construction, it is to be understood that such changes will be within the spirit and scope of the present invention.

I claim:

1. A water control trigger device comprising: a vertically mountable ntable water collecting container having walls forming a water pocket with the back wall being mountable on a supporting surface, said pocket having a drain hole and spaced electrical contacts symmetrically located relative to said drain hole, the top surfaces of said contacts being contiguous with the inner surface of said pocket at approximately the same elevation as the drain hole, whereby the collection of water in the pocket to an elevation higher than the top surfaces of said contacts causes an electrical connection between said contacts.

2. The trigger device as in claim 1 in combination with an electrically actuated aperture closure means: comprising a motor driven mechanism including a lug and a normally spring closed switch in series with said contacts, and means including a source of electrical energy whereby water accumulation in said pocket actuates the closure and closes the aperture and which lug engages said switch and opens said switch.

* * * * *